United States Patent [19]

Greaney

[11] Patent Number: 5,422,026

[45] Date of Patent: Jun. 6, 1995

[54] PHOSPHATE-FREE ANTIFREEZE FORMULATION

[75] Inventor: James P. Greaney, Glenmoore, Pa.

[73] Assignee: Arco Chemical Technology, L.P., Greenville, Del.

[21] Appl. No.: 92,662

[22] Filed: Jul. 15, 1993

Related U.S. Application Data

[63] Continuation of Ser. No. 810,613, Dec. 19, 1991, which is a continuation-in-part of Ser. No. 659,794, Feb. 25, 1991, abandoned, which is a continuation-in-part of Ser. No. 627,513, Dec. 14, 1990, abandoned.

[51] Int. Cl.⁶ ............................................. C09K 5/00
[52] U.S. Cl. ...................................... 252/73; 252/74; 252/75; 252/76; 252/78.3
[58] Field of Search .................... 252/74, 75, 73, 78.3

[56] References Cited

U.S. PATENT DOCUMENTS

| | | |
|---|---|---|
| 2,147,409 | 2/1939 | Lamprey . |
| 2,373,570 | 4/1945 | Keller . |
| 2,566,923 | 9/1951 | Burghart . |
| 2,726,215 | 12/1955 | Jones . |
| 2,815,328 | 12/1957 | Green et al. . |
| 3,960,740 | 6/1976 | Truett . |
| 4,000,079 | 12/1976 | Ramp et al. . |
| 4,149,965 | 4/1979 | Wilson . |
| 4,219,433 | 8/1980 | Manabe et al. . |
| 4,242,214 | 12/1980 | Lambert, Jr. . |
| 4,338,209 | 7/1982 | Manage et al. . |
| 4,382,008 | 5/1983 | Boreland et al. ............ 252/73 |
| 4,382,870 | 5/1983 | Abel et al. ............ 252/75 |
| 4,389,371 | 6/1983 | Wilson et al. ............ 252/75 |
| 4,414,126 | 11/1983 | Wilson et al. ............ 252/75 |
| 4,450,088 | 5/1984 | Wilson et al. ............ 252/75 |
| 4,455,248 | 6/1984 | Wood ............ 252/75 |
| 4,506,684 | 4/1985 | Huff et al. ............ 252/76 |
| 4,545,925 | 10/1985 | Boosa et al. ............ 252/75 |
| 4,561,990 | 12/1985 | Darden ............ 252/75 |
| 4,587,028 | 5/1986 | Darden ............ 252/75 |
| 4,588,513 | 5/1986 | Triebel et al. ............ 252/75 |
| 4,717,495 | 1/1988 | Hercamp et al. ............ 252/75 |
| 4,725,405 | 2/1988 | Cassin et al. ............ 252/75 |
| 4,759,864 | 7/1988 | Van Neste et al. ............ 252/75 |
| 4,772,408 | 9/1988 | Mohr et al. ............ 252/75 |
| 5,064,552 | 11/1991 | Oppenlaender ............ 252/70.3 |

FOREIGN PATENT DOCUMENTS 1004259 9/1965 United Kingdom .

Primary Examiner—Paul Lieberman
Assistant Examiner—Necholus Ogden
Attorney, Agent, or Firm—William C. Long

[57] ABSTRACT

The invention provides an alkylene glycol, preferably propylene glycol, anti-corrosive antifreeze concentrate composed of the glycol and small but effective amounts of borate, sebacate, molybdate, mercaptobenzothiazole, nitrate, tolyltriazole and silicate. The concentrate is suitably combined with water to form an internal combustion engine coolant which meets all ASTM testing criteria.

6 Claims, No Drawings

PHOSPHATE-FREE ANTIFREEZE FORMULATION

RELATED APPLICATIONS

Continuation of Ser. No. 810,613, Dec. 19, 1991 which application is a continuation-in-part of application Ser. No. 07/659,794 filed Feb. 25, 1991, now abandoned which application is, in turn, a continuation-in-part of application Ser. No. 07/627,513 filed Dec. 14, 1990 and now abandoned.

BACKGROUND OF THE INVENTION

1. Field of the Invention

The present invention relates to phosphate free corrosion-inhibited antifreeze concentrate formulations and to phosphate free aqueous corrosion-inhibited antifreeze formulations for use in the cooling systems of internal combustion engines. In particular, the invention relates to an antifreeze concentrate comprised predominantly of a glycol, most notably propylene glycol, together with borate, sebacate, molybdate, mercaptobenzothiazole, nitrate, tolyltriazole, and silicate, and to aqueous formulations containing said concentrate.

2. Description of the Prior Art

The use of each of the components employed in the formulations of the present invention is taught in the art.

Propylene glycol is taught as a freezing point depressant in antifreeze formulations, for example in U.S. Pat. Nos. 2,147,409, 4,149,985 and many others.

Alkali metal borates have been used as corrosion-inhibitors in antifreeze formulations. See, for example, U.S. Pat. Nos. 4,149,985, 2,566,923, 3,960,740, 2,373,570, 2,815,328 and the like.

Alkali metal sebacates have been used as corrosion inhibitors in aqueous systems as taught in U.S. Pat. No. 2,726,215, and in antifreeze coolants as taught in U.K. Patent 1,004,259 and in U.S. Pat. Nos. 4,382,008, 4,561,990, 4,587,028, 4,588,513 and the like.

Alkali metal molybdates have been taught as corrosion-inhibitors in antifreeze formulations. See U.S. Pat. Nos. 2,147,409 and 4,561,990, for example.

Alkali metal mercaptobenzothiazole has been used in antifreeze formulations along with other additives. See, for example, U.S. Pat. Nos. 2,815,328, 4,455,248, 4,414,126, 4,545,925 and the like.

Alkali metal nitrates have been added to antifreeze formulations as corrosion-inhibitors. See, for example, U.S. Pat. Nos. 2,815,328, 4,508,684, 4,455,248, 4,587,028 and the like.

Tolyltriazole is taught as an antifreeze formulation component, for example in U.S. Pat. Nos. 4,242,214, 2,587,028, 4,382,008, U.K. Patent 1,004,259 and the like.

In addition, alkali metal silicates are shown as antifreeze components in, for example, U.S. Pat. Nos. 2,815,328, 4,242,214, 4,382,008, 4,382,870, 4,455,248, 4,149,985 and the like.

Alkali metal phosphates have been used as corrosion-inhibiting components of antifreeze formulations as shown, for example, in U.S. Pat. Nos. 2,147,409, 4,382,870, 4,455,248, 4,149,985, 4,545,925 and the like.

A considerable number of patents have been granted which are directed to antifreeze formulations which comprise certain specific combinations of components. Included among such patents are U.S. Pat. Nos. 4,242,214, 4,382,008, 4,382,870, 4,455,248, 4,561,990, 4,587,028, 4,588,513, 4,545,925, 4,000,079, 4,338,209, 4,759,864, 4,219,433 and many others.

SUMMARY OF INVENTION

The present invention relates to a phosphate free anti-corrosive antifreeze concentrate and to aqueous antifreeze coolants using the concentrate which satisfy the rigorous standards imposed on such coolants. Specifically, the present invention provides an antifreeze concentrate comprised of a major proportion of an alkylene glycol together with small but critical amounts of borate, sebacate, molybdate, mercaptobenzothiazole, nitrate, tolyltriazole, and silicate as well as to aqueous coolants containing the concentrate, which is especially useful in areas where phosphates are prohibited. Especially preferred concentrates are those wherein the alkylene glycol is propylene glycol.

DETAILED DESCRIPTION OF THE INVENTION

Alkylene glycols which are used in the formulations of the invention include ethylene glycol, propylene glycol, diethylene glycol and mixtures. Formulations containing propylene glycol are preferred. In general, the antifreeze concentrates of the invention contain 90 to 98 wt % of the glycol, although this amount may vary considerably.

As above indicated, the antifreeze concentrate of the invention contains, in addition to glycol, small but critical and effective amounts of borate, sebacate, molybdate, mercaptobenzothiazole, nitrate, tolyltriazole and silicate. Phosphate is excluded, and thus the formulation is particularly useful in marketing areas where the use of phosphate is prohibited.

These components are incorporated in the antifreeze concentrate in soluble compound form, preferably in the form of an alkali metal salt, and most preferably as the sodium or potassium salt.

The antifreeze concentrate of the present invention contains by weight 0.01 to 0.50% borate calculated as $B_4O_7$, 0.1 to 0.5% sebacate calculated as $C_{10}H_{16}O_4$, 0.53 to 1.0% molybdate calculated as $MoO_4$, 0.04 to 0.22% mercaptobenzothiazole calculated as mercaptobenzothiazole, 0.04 to 0.30% nitrate calculated as $NO_3$, 0.05 to 0.30% tolyltriazole calculated as tolyltriazole, and 0.042 to 0.09% silicate calculated as $SiO_2$. It is desirable to include an effective amount of an antifoaming compound in the concentrate. Such components are well known and preferably may be a polyglycol-type or a silicone-type antifoaming agent. The concentrate contains small amounts of water, usually 1 to 5% by weight water. Alkali metal hydroxide is employed to provide a final pH of 9–10 for the concentrate plus water coolant formulation.

Sodium tetraborate is the preferred borate additive; the available hydrates such as sodium tetraborate pentahydrate ($Na_2B_4O_7 \cdot 5H_2O$) and sodium tetraborate decahydrate ($Na_2B_4O_7 \cdot 10H_2O$) are conveniently employed, the latter being preferred. Borate, expressed as sodium tetraborate decahydrate, in amount of 0.80 to 1.2 wt. % of the concentrate is employed in accordance with the invention.

In order to form sebacate, sebacic acid and alkali metal hydroxide can be separately added to the formulation with the alkali metal sebacate formed in situ. Alternatively, the sebacate salt, e.g., sodium sebacate ($Na_2C_{10}H_{16}O_4$) can be used directly. Sebacate, expressed as sebacic acid, is employed in accordance with the invention in amount of 0.1 to 0.5 wt. % of the antifreeze concentrate.

Sodium molybdate (Na₂MoO₄) is the preferred molybdate additive. The commercially available dihydrate (Na₂MoO₄ . 2 H₂O) is conveniently employed. Molybdate expressed as sodium molybdate dihydrate in amount of 0.20 to 1.5 wt. % of the antifreeze concentrate is employed in accordance with the invention.

Sodium mercaptobenzothiazole (NaC₇H₄NS₂) is the preferred mercaptobenzothiazole additive; the compound, which may be added as a 50% solution in water, is employed in amount of 0.10 to 0.50 wt. % of the concentrate in accordance with the invention.

Nitrate is preferably added in the form of sodium nitrate (NaNO₃). In accordance with the invention, nitrate, expressed as sodium nitrate, in amount of 0.05 to 0.40 wt. % is employed in the antifreeze concentrate.

Silicate is suitably employed in the form of sodium metasilicate (Na₂SiO₃). The available hydrates, most notably the pentahydrate (Na₂SiO₃ . 5H₂O) are conveniently used. Expressed as sodium metasilicate pentahydrate, amounts of 0.15 to 0.30 wt. % of the antifreeze concentrate are employed in accordance with the invention.

Tolyltriazole, also known as methylbenzotrizole, (C₇H₇N₃) is employed in the antifreeze concentrate in amounts of 0.05 to 0.30 wt. % of the concentrate in accordance with the invention.

Alkali metal hydroxide, preferably NaOH is employed in amount sufficient to react with sebacic acid to form sodium sebacate and to provide a final pH of 9-10 for the antifreeze combination of water and concentrate.

Summarizing, the antifreeze concentrates of the invention have the composition by weight shown in the following table:

TABLE 1

| COMPONENT | (WT %) CONCENTRATION RANGE |
|---|---|
| Alkylene Glycol | 90 to 98 |
| Water | 1 to 5 |
| Borate, calculated as $B_4O_7$ | 0.10 to 0.50 |
| Sebacate, calculated as $C_{10}H_{16}O_4$ | 0.10 to 0.50 |
| Molybdate, calculated as $MoO_4$ | 0.53 to 1.0 |
| Mercaptobenzothiazole, calculated as mercaptobenzothiazole | 0.04 to 0.22 |
| Nitrate, calculated as $NO_3$ | 0.04 to 0.30 |
| Tolyltriazole, calculated as tolyltriazole | 0.05 to 0.30 |
| Silicate, calculated as $SiO_2$ | 0.042 to 0.09 |

Propylene glycol is the preferred glycol and the various components are preferably alkali metal compounds, usually sodium compounds according to the following:

TABLE 2

| COMPONENT | (WT %) CONCENTRATION RANGE |
|---|---|
| Propylene Glycol | 90 to 98 |
| Water | 1 to 5 |
| Sodium Tetraborate Decahydrate (Na₂B₄O₇.10H₂O) | 0.20 to 1.20 |
| Sodium Sebacate (Na₂C₁₀H₁₆O₄) | 0.10 to 0.50 |
| Sodium Molybdate (VI) Dihydrate (Na₂MoO₄.2H₂O) | 0.80 to 1.5 |
| Sodium Mercaptobenzothiazole, 50% soln (NaC₇H₄NS₂) | 0.10 to 0.50 |
| Sodium Nitrate (NaNO₃) | 0.05 to 0.40 |
| Tolyltriazole (methylbenzyltriazole) (C₇H₇N₃) | 0.05 to 0.30 |
| Sodium Metasilicate Pentahydrate (Na₂SiO₃.5H₂O) | 0.15 to 0.30 |

The present invention relates to the antifreeze concentrates described above as well as to coolant formulations wherein the concentrate is admixed with water and employed in internal combustion engines. Generally, it is desirable to admix the concentrate with about an equal volume of water for use, although amounts of water ranging broadly from 30 to 80 wt. % of the coolant formulation are useful.

EXAMPLE I

An antifreeze concentrate was prepared as follows:

In preparing the concentrate, propylene glycol was first combined with the (Pluronic) L-61 and the sodium mercaptobenzothiazole solution with agitation. To this glycol solution were individually added the sodium tetraborate decahydrate, the sodium nitrate, the sebacic acid and the tolyltriazole with good agitation and mild heating (50° C.) until the components dissolved. In a separate vessel the water and Q-1-6083 silicate stabilizer were combined with agitation and to this was added the caustic. When the caustic had dissolved, the sodium metasilicate was slowly added and allowed to dissolve. After the metasilicate had dissolved, the sodium molybdate dihydrate was added in several portions with good agitation and heating to about 50° C. When the molybdate was dissolved, the resulting solution was slowly added to the glycol solution with stirring to form the final antifreeze concentrate having the composition shown in Table 3.

TABLE 3

| COMPONENT | (WT %) CONCENTRATION |
|---|---|
| Propylene Glycol | 95.365 |
| Water | 2.00 |
| Sodium Tetraborate Decahydrate (Na₂B₄O₇.10H₂O) | 0.45 |
| Sebacic Acid (C₁₀H₁₈O₄) | 0.25 |
| Sodium Molybdate (VI) Dihydrate (Na₂MoO₄.2H₂O) | 1.00 |
| Sodium Mercaptobenzothiazole, 50% soln (NaC₇H₄NS₂) | 0.25 |
| Sodium Nitrate (NaNO₃) | 0.15 |
| Tolyltriazole (methylbenzyltriazole) (C₇H₇N₃) | 0.125 |
| Sodium Metasilicate Pentahydrate (Na₂SiO₃.5H₂O) | 0.20 |
| Sodium Hydroxide (NaOH) | 0.15 |
| Q 1-6083* (silicate stabilizer) | 0.05 |
| Pluronic L-61** (antifoam) | 0.01 |

*Polysiloxane manufactured by Dow Corning.
**Polyoxypropylene - polyoxyethylene block copolymer manufactured by BASF.

The concentrate was subjected to certain standard ASTM tests to determine its suitability. The following are the results attained:

ASTM TEST RESULTS
D-1384 Corrosion Test for Engine Coolants in Glassware

| Coupon | Avg. Weight Loss, mg | Max Allowed* |
|---|---|---|
| copper | 3 | 10 |
| solder | 1 | 30 |
| brass | 3 | 10 |
| steel | 3 | 10 |
| cast iron | 3 | 10 |
| aluminum | 0 | 30 |

D-4340 Corrosion of Cast Aluminum Alloys in Engine Coolants Under Heat-Rejecting Conditions

| Average Weight Loss, mg/cm2/week | Max Allowed* |
|---|---|
| 0.17 | 1.0 |

D-2570 Simulated Service Corrosion Testing of Engine Coolants

| Coupon | Avg. Weight Loss, mg | Max Allowed* |
|---|---|---|
| copper | 9 | 20 |
| solder | 3 | 60 |
| brass | 7 | 20 |
| steel | 2 | 20 |
| cast iron | 1 | 20 |

\* - Maximum corrosion weight loss as specified in ASTM D-3306-89 specification for EG base engine coolants.

From these results it can be seen that the concentrate composition of the invention passed these ASTM test requirements by a wide margin.

In order to demonstrate the surprising results achieved in accordance with the invention, comparative tests were performed with antifreeze concentrates which did not have the composition of the invention. The following Table 4 compares the formulation of the invention from Table 3, formulation A, with similar formulations B and C which are not in accordance with the invention.

TABLE 4

| COMPONENT | (WT %) CONCENTRATION FORMULATION | | |
|---|---|---|---|
| | A | B | C |
| Propylene Glycol | 95.365 | 96.175 | 95.44 |
| Water | 2.00 | 2.00 | 2.00 |
| Sodium Tetraborate Decahydrate ($Na_2B_4O_7 \cdot 10H_2O$) | 0.45 | 0.45 | 0.45 |
| Sebacic Acid ($C_{10}H_{18}O_4$) | 0.25 | 0.25*** | 0.25 |
| Sodium Molybdate (VI) Dihydrate ($Na_2MoO_4 \cdot 2H_2O$) | 1.00 | 0.50 | 1.00 |
| Sodium Mercaptobenzothiazole, 50% soln ($NaC_7H_4NS_2$) | 0.25 | 0.25 | 0.25 |
| Sodium Nitrate ($NaNO_3$) | 0.15 | 0.15 | 0.15 |
| Tolyltriazole (methylbenzyltriazole) ($C_7H_7N_3$) | 0.125 | 0.125 | 0.125 |
| Sodium Metasilicate Pentahydrate ($Na_2SiO_3 \cdot 5H_2O$) | 0.20 | 0.10 | 0.10 |
| Sodium Hydroxide (NaOH) | 0.15 | — | 0.185 |
| Q 1-6083* (silicate stabilizer) | 0.05 | 0.05 | — |
| Pluronic L-61** (antifoam) | 0.01 | — | — |

TABLE 4-continued

| COMPONENT | (WT %) CONCENTRATION FORMULATION | | |
|---|---|---|---|
| | A | B | C |
| (antifoam) | | | |

*Polysiloxane manufactured by Dow Corning.
**Polyoxypropylene - polyoxyethylene block copolymer manufactured by BASF.
***Actually added as sodium sebacate ($Na_2C_{10}H_{16}O_4$)

The following Tables 5 and 6 compare results of standard ASTM tests obtained with the formulations A, B and C from Table 4:

TABLE 5

D-1384 Corrosion Test for Engine Coolants in Glassware

| Coupon | Avg. Weight Loss, mg. Formulation | | | Max Allowed* |
|---|---|---|---|---|
| | A | B | C | |
| copper | 3 | 3 | 3 | 10 |
| solder | 1 | 7 | 3 | 30 |
| brass | 3 | 1 | 2 | 10 |
| steel | 3 | 1 | 1 | 10 |
| cast iron | 3 | 102 | 5 | 10 |
| aluminum | 0 | 0 | 4 | 30 |

TABLE 6

D-4340 Corrosion of Cast Aluminum Alloys in Engine Coolants Under Heat-Rejecting Conditions

| Average Weight Loss, mg/cm2/week Formulation | | | Max Allowed* |
|---|---|---|---|
| A | B | C | |
| 0.17 | — | 3.23 | 1.0 |

From the data it can be seen that comparative formulation B failed the D-1384 iron corrosion test by a substantial margin and that formulation C, although passing the D-1384 corrosion test, failed the D-4340 cast aluminum corrosion test. By contrast, formulation A passed both tests.

What is claimed is:

1. A phosphate-free anti-corrosive antifreeze concentrate consisting essentially of:

| COMPONENT | (WT %) CONCENTRATION RANGE |
|---|---|
| [Alkylene] Propylene Glycol | 90 to 98 |
| Water | 1 to 5 |
| Borate, calculated as $B_4O_7$ | 0.01 to 0.50 |
| Sebacate, calculated as $C_{10}H_{16}O_4$ | 0.10 to 0.50 |
| Molybdate, calculated as $MoO_4$ | 0.53 to 1.0 |
| Mercaptobenzothiazole, calculated as mercaptobenzothiazole | 0.04 to 0.22 |
| Nitrate, calculated as $NO_3$ | 0.04 to 0.30 |
| Tolyltriazole, calculated as tolyltriazole | 0.05 to 0.30 |
| Silicate, calculated as $SiO_2$ | 0.042 to 0.09 |

2. A phosphate-free anti-corrosive antifreeze concentrate consisting essentially of:

| COMPONENT | (WT %) CONCENTRATION RANGE |
|---|---|
| [Alkylene] Propylene Glycol | 90 to 98 |
| Water | 1 to 5 |
| Sodium Tetraborate Decahydrate ($Na_2B_4O_7 \cdot 10H_2O$) | 0.20 to 1.20 |
| Sodium Sebacate ($Na_2C_{10}H_{16}O_4$) | 0.10 to 0.50 |

-continued

| COMPONENT | (WT %) CONCENTRATION RANGE |
|---|---|
| Sodium Molybdate (VI) Dihydrate ($Na_2MoO_4.2H_2O$) | 0.80 to 1.5 |
| Sodium Mercaptobenzothiazole, 50% soln ($NaC_7H_4NS_2$) | 0.10 to 0.50 |
| Sodium Nitrate ($NaNO_3$) | 0.05 to 0.40 |
| Tolyltriazole (methylbenzyltriazole) ($C_7H_7N_3$) | 0.05 to 0.30 |
| Sodium Metasilicate Pentahydrate ($Na_2SiO_3.5H_2O$) | 0.15 to 0.30 |

3. A coolant suitable for use in internal combustion engines which comprises the composition of claim 1 in admixture with water, water comprising 30-80 wt % of the coolant, said coolant containing alkali metal hydroxide in amount sufficient to provide a coolant pH of about 9-10.

4. A coolant suitable for use in internal combustion engines which comprises the composition of claim 1 in admixture with water, water comprising 40-60 wt % of the coolant, said coolant containing alkali metal hydroxide in amount sufficient to provide a coolant pH of about 9-10.

5. A coolant suitable for use in internal combustion engines which comprises the composition of claim 2 in admixture with water, water comprising 30-80 wt % of the coolant, said coolant containing alkali metal hydroxide in amount sufficient to provide a coolant pH of about 9-10.

6. A coolant suitable for use in internal combustion engines which comprises the composition of claim 2 in admixture with water, water comprising 40-60 wt % of the coolant, said coolant containing alkali metal hydroxide in amount sufficient to provide a coolant pH of about 9-10.

* * * * *